(12) United States Patent
Simon et al.

(10) Patent No.: US 6,181,260 B1
(45) Date of Patent: *Jan. 30, 2001

(54) AUTOMATIC WEATHER MONITORING AND ADAPTIVE TRANSMITTING SYSTEM

(75) Inventors: Gary B. Simon, Winchester, MA (US); David Wartofsky, Fort Washington, MD (US)

(73) Assignee: Potomac Aviation Technology Corp, Boston, MA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

This patent is subject to a terminal disclaimer.

(21) Appl. No.: 08/617,617

(22) Filed: Mar. 19, 1996

Related U.S. Application Data

(60) Continuation-in-part of application No. 08/411,583, filed on Mar. 29, 1995, now Pat. No. 5,565,863, which is a division of application No. 08/215,926, filed on Mar. 22, 1994, now Pat. No. 5,434,565.

(51) Int. Cl.[7] .................................................. G08G 5/00
(52) U.S. Cl. ..................... 340/949; 73/178 T; 340/945; 340/968; 455/63; 455/431
(58) Field of Search ..................... 340/945, 947, 340/948, 949, 952, 502, 313, 968, 963, 905; 73/178 T, 170.01, 170.02, 170.05, 170.06, 170.16; 701/200; 455/63, 431

(56) References Cited

U.S. PATENT DOCUMENTS

| 3,235,838 | * | 2/1966 | Hilt . |
| 3,281,789 | | 10/1966 | Willcox et al. . |
| 3,373,405 | | 3/1968 | Gadbois . |

(List continued on next page.)

FOREIGN PATENT DOCUMENTS

| 0 319 491 | 6/1989 | (EP) | ................................ G01W/1/00 |
| 0 344 624 A2 | 6/1989 | (EP) . | |
| 0 344 624 A3 | 6/1989 | (EP) . | |
| 0 319 491 A1 | 7/1989 | (EP) . | |
| 2 654 536 | 5/1991 | (FR) | ................................ G08G/5/00 |
| 0134929 | 5/1990 | (JP) | ..................................... 455/67.4 |
| 2003746 | * 3/1992 | (WO) | ..................................... 340/961 |

OTHER PUBLICATIONS

F.A.A. Advisory Circular, "Automated Weather Observing Systems (AWOS) for Non–Federal Applications", AC No. 150/5220–16A, Jun. 12, 1990, pp. 1–51.

"The Automatic Terminal Advisory System" Marketing material and system specifications. Some dates given, no dates confirmed.

Plane and Pilot, "Automatic Advisory System", Mar. 1990.

*Primary Examiner*—Brent A. Swarthout
(74) *Attorney, Agent, or Firm*—Hamilton, Brook, Smith & Reynolds, P.C.

(57) ABSTRACT

A method for automatically providing weather advisories for an airport to pilots comprises monitoring weather conditions at the airport and then generating weather advisories in response to these weather conditions. The broadcast traffic on a common traffic advisory channel is also simultaneously monitored and then menus providing for selectable weather advisories and radio check options are broadcast to the pilots. The weather advisories or radio check can then be selected by the pilot by clicks of their transmit button. The time spacing between the menus is adaptively changed in response to traffic on the common traffic advisory frequency. Also, the length of the weather advisories is also changed in response to this traffic. The radio check option is provided automatically by first confirming selection of the radio check option and then allowing the broadcaster to broadcast a short message which is recorded by the system and then rebroadcast.

32 Claims, 5 Drawing Sheets

U.S. PATENT DOCUMENTS

| | | | |
|---|---|---|---|
| 3,598,910 | 8/1971 | Johnston et al. | |
| 3,699,443 | 10/1972 | Weger | |
| 3,737,782 | 6/1973 | Pierce | 325/363 |
| 3,914,692 | 10/1975 | Seaborn, Jr. | 325/53 |
| 3,949,399 | 4/1976 | Huber et al. | 343/100 |
| 4,043,194 | 8/1977 | Tanner | |
| 4,048,564 | 9/1977 | Gleeson, Jr. | 325/67 |
| 4,079,905 | 3/1978 | Greene | 244/191 |
| 4,093,937 | 6/1978 | Habinger | |
| 4,162,449 | 7/1979 | Bouyssounouse et al. | 325/55 |
| 4,163,216 * | 7/1979 | Arpino | 340/949 |
| 4,234,952 * | 11/1980 | Gable et al. | 370/94 |
| 4,295,139 * | 10/1981 | Arpino | 340/949 |
| 4,318,076 | 3/1982 | Whitfield | |
| 4,354,275 | 10/1982 | Bouyssounouse et al. | 455/54 |
| 4,519,069 | 5/1985 | Pudsey | 370/85 |
| 4,635,285 | 1/1987 | Coombes | 379/63 |
| 4,744,083 | 5/1988 | O'Neill et al. | 371/22 |
| 4,777,656 | 10/1988 | Wade | 455/98 |
| 4,780,715 | 10/1988 | Kasugai | 340/825.08 |
| 4,788,543 | 11/1988 | Rubin | 340/825.44 |
| 4,839,645 | 6/1989 | Lill | 340/870.17 |
| 4,857,030 | 8/1989 | Rose | 446/303 |
| 4,970,510 | 11/1990 | Stelling | 340/945 |
| 5,025,382 | 6/1991 | Artz | 364/439 |
| 5,027,427 | 6/1991 | Shimizu | 455/67 |
| 5,105,191 * | 4/1992 | Keedy | 340/968 |
| 5,210,611 | 5/1993 | Yee et al. | 358/191.1 |
| 5,240,207 * | 8/1993 | Eiband et al. | 244/190 |
| 5,265,024 | 11/1993 | Crabill et al. | 364/443 |
| 5,282,204 | 1/1994 | Shpancer et al. | 370/94.2 |
| 5,305,374 | 4/1994 | Snyder | 379/67 |
| 5,353,326 | 10/1994 | Jung | 379/6 |
| 5,361,402 | 11/1994 | Grube et al. | 455/67.1 |
| 5,396,651 | 3/1995 | Nitardy | 455/54.2 |
| 5,434,565 * | 7/1995 | Simon et al. | 340/949 |
| 5,463,382 | 10/1995 | Nikas et al. | 340/825.44 |

* cited by examiner

AUTOMATIC WEATHER MONITORING AND ADAPTIVE TRANSMITTING SYSTEM

RELATED APPLICATIONS

This application is a continuation-in-part of U.S. Ser. No. 08/411,583, filed Mar. 29, 1995, now U.S. Pat. No. 5,565,863 which is a divisional of U.S. Ser. No. 08/215,926, filed Mar. 22, 1994, now U.S. Pat. No. 5,434,565, the entire teachings of which are incorporated herein by reference.

BACKGROUND OF THE INVENTION

At large airports, takeoff and landing slots, runway assignments, holding patterns, and approaches are handled by the tower's air traffic controllers during operating hours of the control tower. Smaller airports, however, rarely have the traffic to justify the expenses associated with the equipment and salaries of the tower crew. Instead, most small airports have their own Common Traffic Advisory Frequency (CTAF) which is unique for their geographic region. A CTAF is also usually assigned for after hours use at controlled airports. The CTAF of each airport is published and readily available.

Essentially, the CTAF serves as a radio bulletin board. A pilot approaching or departing an airport tunes to the CTAF channel for that airport and monitors for activity. The pilot will then broadcast his/her intentions and position so that other pilots also monitoring the CTAF channel can plan their own operations accordingly. Consequently, broadcasts on the CTAF are rarely to a specific listener. Instead, they are simply general declarations of an intended course of action to anyone currently using the airport. In this way, smaller airports have a system by which pilots can coordinate their activities without requiring a dedicated control tower.

In addition to the bulletin board function, a pilot can also ask for a radio check on the CTAF from other listeners and get information regarding the airport's services and other business functions. The limitations on CTAF usage are set forth by Federal Communications Commission Regulations.

On a related topic, many mid- and larger size airports have an Automatic Weather Observation System (AWOS) which, as its name suggests, automatically provides weather information over a dedicated frequency. Most commonly, the AWOS units are small weather stations that monitor wind speed, wind direction, dew point, and barometric pressure and then transmit this gathered information using a synthesized voice continually and repeatedly every one to three minutes. The frequency allocations for the AWOS are also published so that an incoming pilot, for example, can select an appropriate runway from the wind direction and speed transmitted by the AWOS system without requiring intervention from the ground.

SUMMARY OF THE INVENTION

The present invention is generally directed to providing AWOS-type information automatically over the CTAF in addition to other services such as radio checks. This is accomplished by providing a system that monitors the traffic over the CTAF and then adaptively broadcasts menus containing radio check options and/or weather advisories.

In general, according to one aspect the invention concerns a method for providing weather information to pilots for an airport. The method includes determining weather conditions for the airport. Automatic weather stations will typically provide this functionality. The radio frequency assigned to the airport is monitored for a predetermined protocol indicative of a pilot attempt to access the weather information. A transceiver interfaces with the radio frequency and a central processing unit reviews demodulated transmissions for the protocol. If the protocol is detected, the radio frequency is first monitored for inactivity, i.e., no transmissions from other sources. Then, the weather advisory, which is derived from the determined weather conditions, is broadcast.

In specific embodiments, the broadcast of the weather advisory is stopped after receiving the predetermined protocol in response to detecting transmissions from other sources lasting over a set time period. One second is the preferred period. The broadcast can also be stopped if it is determined that a weather advisory has been recently broadcast. Delayed broadcasts of the advisories are preferred if there is a high level of traffic on the radio frequency. The system can also be adaptive to minimize the amount it transmits on the frequency when there is a high demand for transmission slots. Specifically, a length of the broadcast weather advisory is changed in response to traffic levels. In all cases, the values of the weather parameter from the weather station can be reviewed, and only those parameters, which are most important, can be included in the advisory.

In other embodiments, the protocol, which triggers the broadcast of the advisories can be microphone click or a spoken phrase. Basically, the system applies pattern recognition schemes in which if the pattern is matched by for example a spoken phrase, microphone clicks or detecting a broadcast after a long period of inactivity the advisory is broadcast. Microphone clicks are detected by the central processor by monitoring the carrier detect signal from the transceiver. The spoken phrase is detected by applying a voice recognition algorithm to the transmissions on the radio frequency and triggering in the advisory broadcast if the phrase is detected.

In general according the another aspect, the invention can also be characterized as a method that includes determining weather conditions for the airport. The radio frequency assigned to the airport is monitored for a predetermined protocol indicative of a pilot attempt to access the weather information and other transmissions. From this information, the level of traffic on the radio frequency can be determined. Based upon this analysis, the length of a weather advisory is changed in response to the traffic.

In general according to another aspect, the invention relates to a system for broadcasting weather advisories to pilots. The system includes an automatic weather station which generates weather data indicative of ambient weather conditions. A transceiver monitors the radio frequency and generates a carrier detect signal in response to transmissions from other sources on a radio frequency. A central processing unit monitors the carrier detect signal for activity on the radio frequency and generates the weather advisories in response to transmission of an activating signal over the radio frequency. The lengths of the weather advisories are modified in response to the level of the activity to minimize the conflict between the system and other parties using the frequency.

The above and other features of the invention including various novel details of construction and combinations of parts will now be more particularly described in reference to the accompanying drawings and pointed out in the claims. It will be understood that the particular automatic weather monitoring and adaptive transmitting system embodying the invention is shown by way of illustration and not as a limitation of the invention. The principles and features of this invention may be employed and varied in numerous embodiments without departing from the scope of the invention.

DETAILED DESCRIPTION OF THE PREFERRED EMBODIMENT

A major drawback of the AWOS is the fact that it requires a dedicated frequency. This requirement is established both by Federal Communication Commission Regulation and by pragmatism. Since the AWOS continually and repeatedly transmits weather information, there is no time in between broadcasts for other people to transmit. Further, there is no system that disables the AWOS transmission when other parties are broadcasting. In addition, obtaining a frequency designation for an AWOS usually takes upwards of three years since few frequencies are still available in the part of the radio spectrum allocated for aviation communication. For these reasons, AWOS systems are often difficult to implement.

Additionally, the fact that AWOS and CTAF are assigned to independent frequencies complicates the pilot's role. For instance, pilot on approach to an airport will have to monitor both the AWOS frequency and the CTAF. Consequently, not only must the airplane contain two radios, but these radios must be correctly tuned and simultaneously monitored by the pilot.

The present invention seeks to solve these recognized problems by expanding the role of the Common Traffic Advisory Frequency (CTAF), or for that matter, any other general communication channel, by providing general information announcements, weather information for example, over the frequency. These announcements are controlled in such a way as to not undermine the frequency's inter-party communication function by avoiding broadcast collisions and adaptively modifying the length and timing of the announcements.

Figure 1:
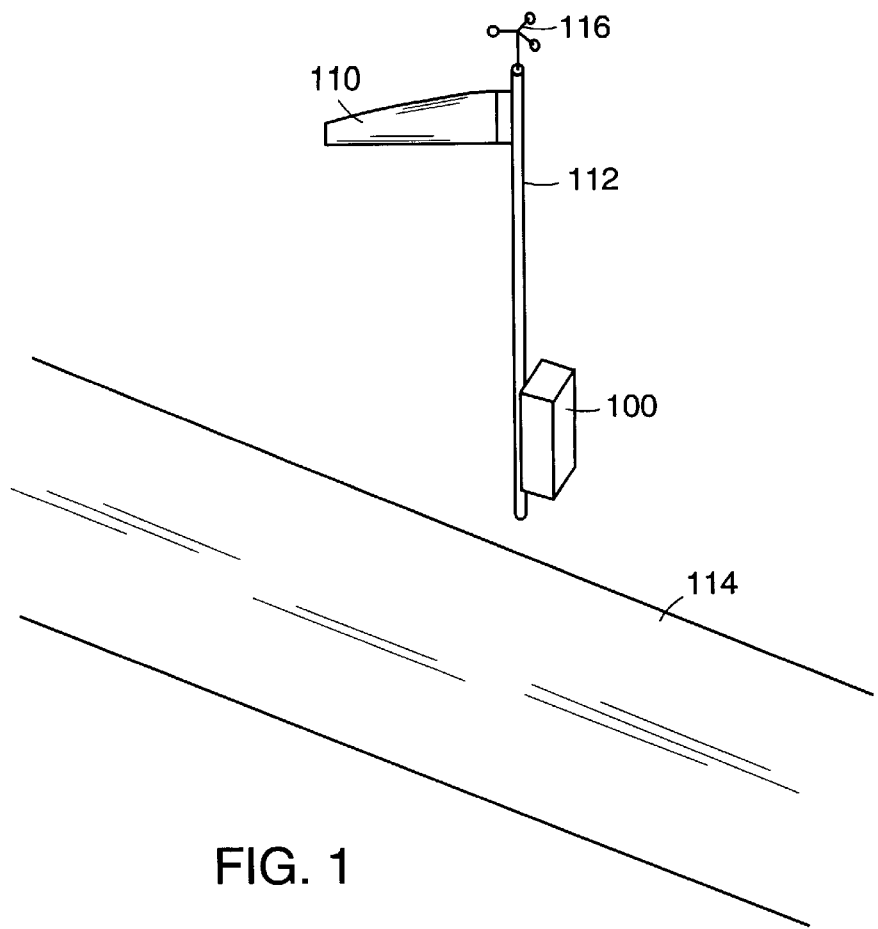
FIG. 1 is a perspective view of the automatic weather monitoring and adaptive transmitting system installed at an airfield.

Turning now to the figures, the location of monitoring and adaptive transmitting system constructed according to the principles of the present invention is shown at a typical airfield in FIG. 1. A windsock 110 hung from a windsock pole 112 is usually located near a principle runway 114 of the airfield. The windsock 110 provides pilots, both on the ground and circling the airport, with wind direction and speed information. The monitoring and adaptive transmitting system 100 is ideally located on the windsock pole 112 so that the weather information it collects will be taken as close to the point of interest, the runway 114, as possible. Also, this central location provides an ideal place for the transmitter since it provides a large and flat ground plane.

Figure 2:
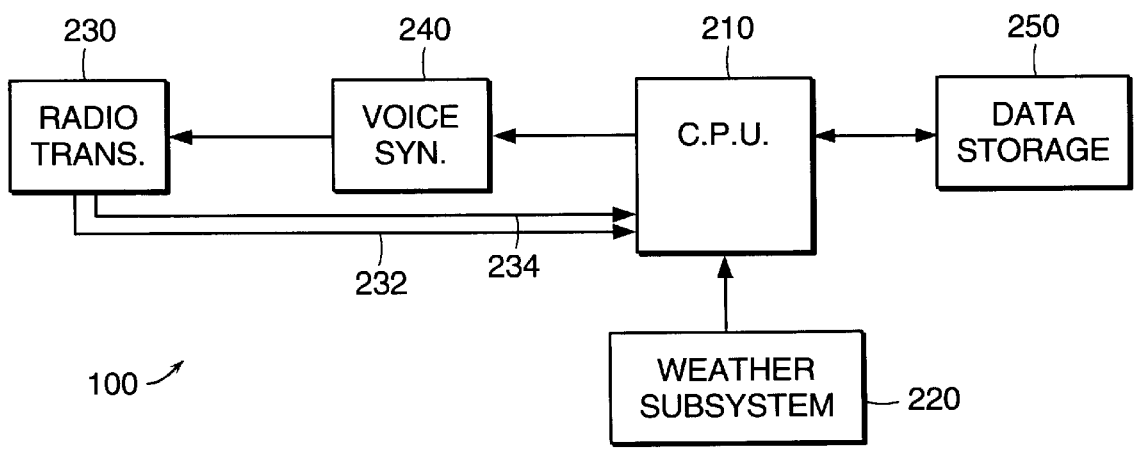
FIG. 2 is a block diagram of the automatic weather monitoring and adaptive transmitting system.

FIG. 2 is a block diagram showing the main components of the monitoring and adaptive transmitting system 100. A central processing unit (CPU) 210 of the system receives weather information from a weather monitoring subsystem 220. The weather monitoring subsystem 220 monitors wind speed and direction through the wind sensor 116 in FIG. 1 on the top of the windsock pole in addition to barometric pressure and dew point. This information is then provided digitally to the central processing unit 210. A radio transceiver 230 continually monitors for broadcasts on the CTAF, and in response to a broadcast from a different source, the radio transceiver 230 generates a carrier detect signal over line 232, which is received by the central processing unit. Also, the transceiver provides received broadcasts to the central processing unit over line 234.

The central processing unit 210 determines the length of each carrier detect signal and categorizes each occurrence of the signal as either a transient, a click or a conversation. If the length of the carrier detect signal is less than 55 milliseconds then the central processing unit 210 assumes that a transient such as an atmospheric discharge has occurred. If the carrier detect signal is between 55 milliseconds and 715 milliseconds, the CPU classifies this event as a click, a depression and release of a transmit button by another broadcast source. A consecutive series of clicks represent a coded request for information. For example, three clicks may represent a request for a weather advisory. Finally, if the length of the carrier detect signal exceeds 715 milliseconds, the signal is classified as a conversation. A series of clicks and conversations are logged as "events" in a data storage system 250. The logged data includes the date, time, classification, and duration of the particular event. On the basis of the database of the logged events and the state of the carrier detect signal, the central processing unit controls a voice synthesizer 240 to generate synthesized voice advisories as described below, which are then broadcasted by the transceiver 230.

Figure 3:
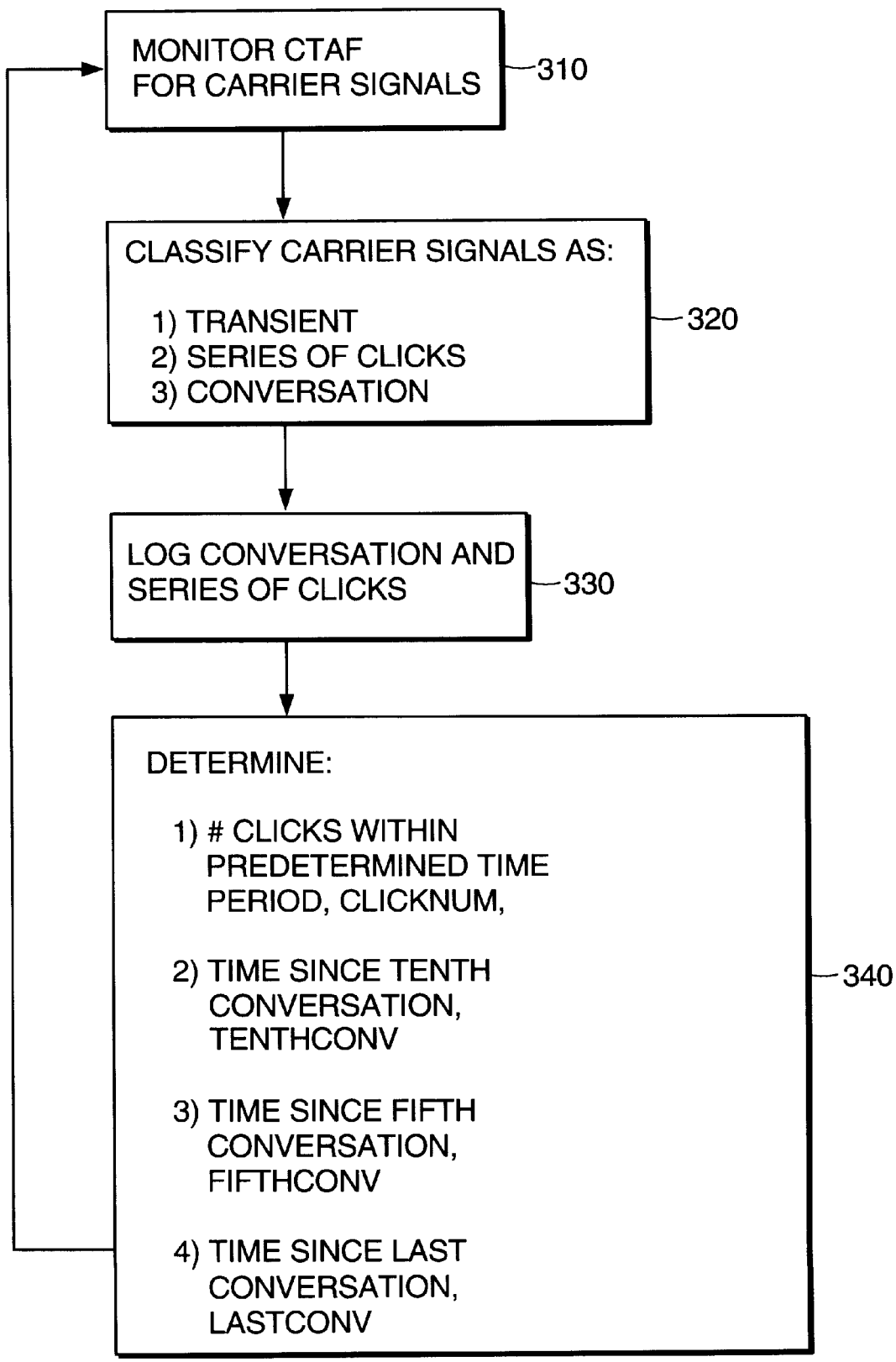
FIG. 3 is a flow diagram of a background routine executed by the central processing unit of the system.

Generally, a background routine, illustrated in FIG. 3, enables the central processing unit to continually monitor the CTAF and log detected events. Specifically, in step 310 the CTAF is monitored and carrier detect signals are generated in response to carrier signals from other sources. Then, in step 320 the detected carrier signals are classified as either a transient, a click, or a conversation. As a result of this classification, events classified as a series of clicks and conversations are logged in the data storage system in step 330.

On the basis of the logged series of clicks and conversations, a number of variables are then continually updated in step 340. CLICKNUM corresponds to the total number of clicks received within a predetermined time period. The predetermined time period corresponds to the period in which the central processing unit will look for a series of clicks to select a particular function. A variable TENTHCONV corresponds to the time that has lapsed since the tenth most recent conversation and thus gives an indication of the levels of traffic or frequency of broadcasts on the frequency. When TENTHCONV is small, traffic on the frequency will be large since a large number of conversations have happened within a short time period. A second variable FIFTHCONV represents the time since the fifth most recent conversation. And finally, LASTCONV corresponds to the time since the last conversation. When the system is first initialized or turned on, TENTHCONV and FIFTHCONV are set to 35 and 10 minutes, respectively. Each of these variables is then passed to a foreground routine while the background routine loops back to step 310.

Figure 4A:
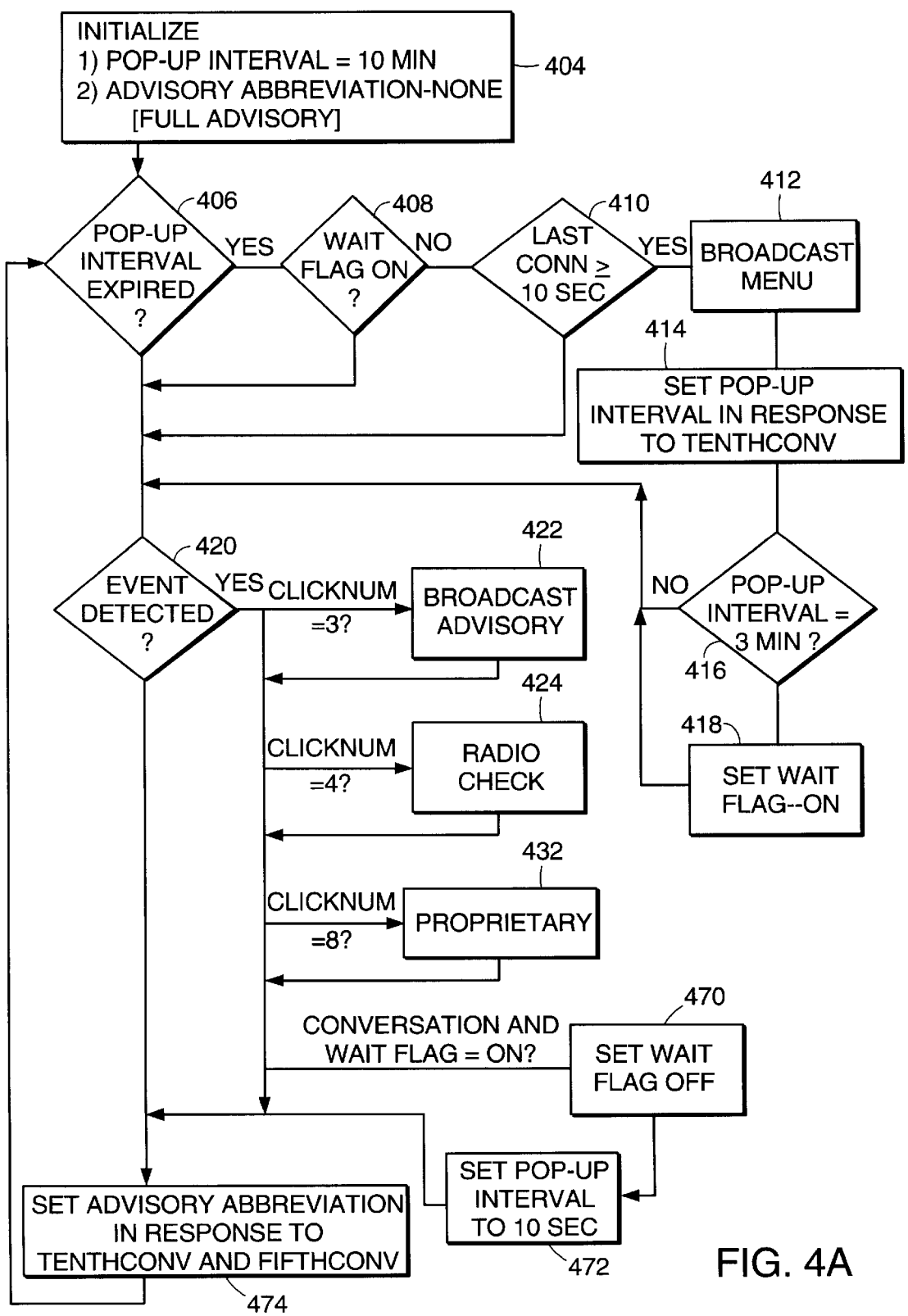
FIGS. 4A, B, and C are flow diagrams of a foreground routine executed by the central processing unit.
Figure 4B:
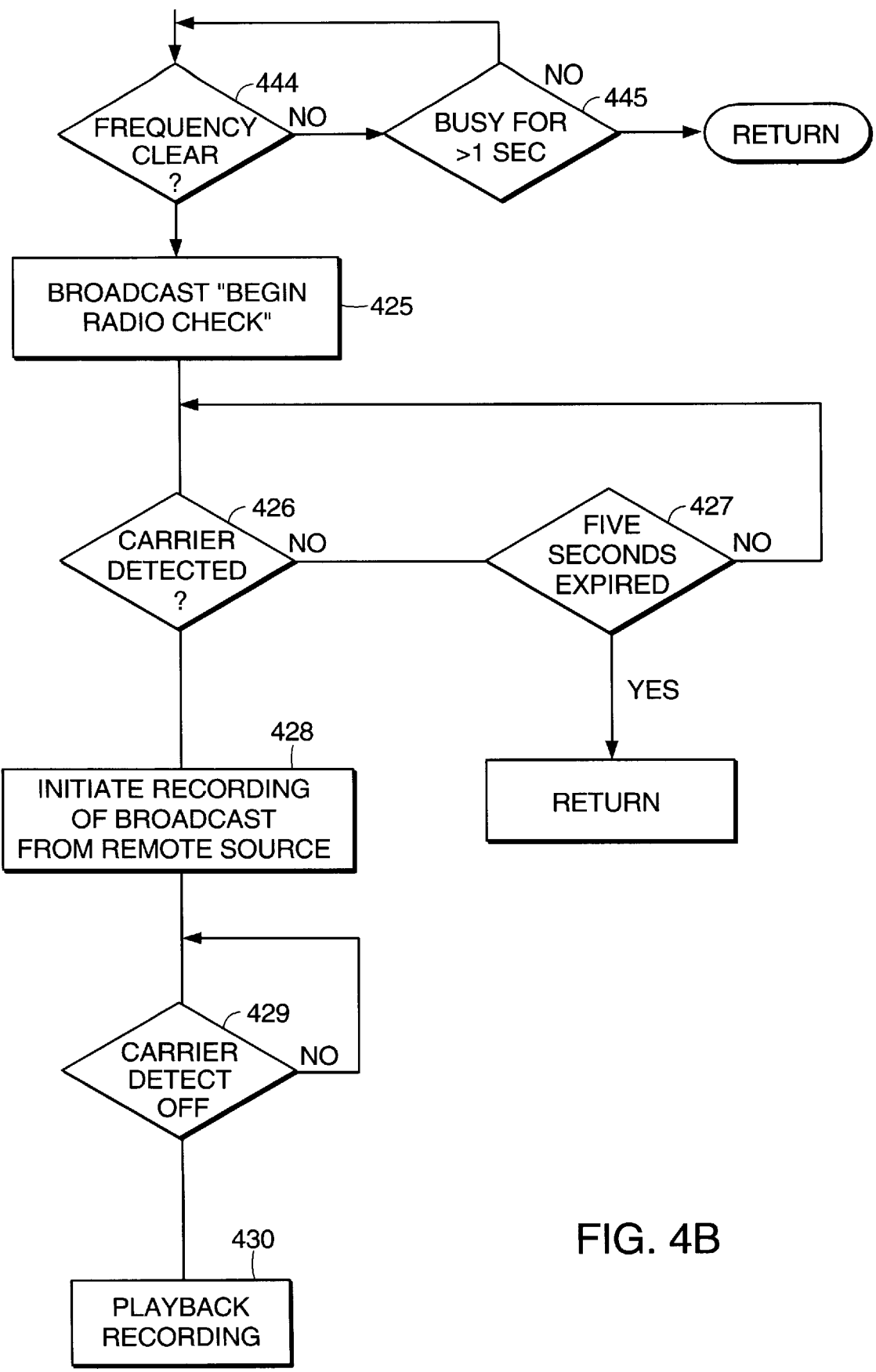
Figure 4C:
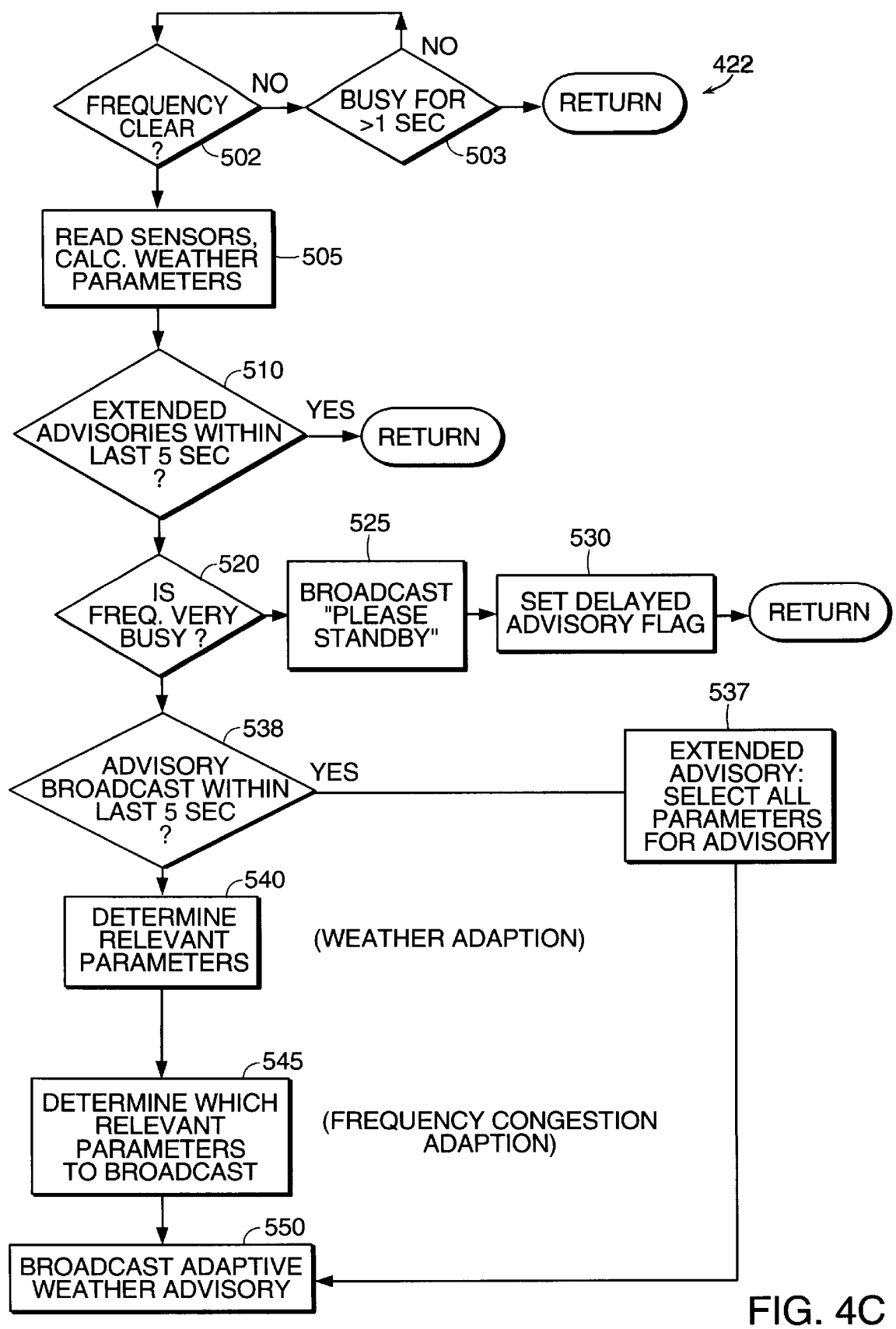

The foreground routine shown in FIGS. 4A through 4C controls the general operation of the system and allows the system to interact with users attempting to access it. The foreground routine begins with an initialization of a pop-up interval to ten minutes and an advisory abbreviation to a full advisory or Level IV in step 404. Advisory abbreviation levels will be described below in detail. The pop-up interval corresponds to the time period between pop-up broadcasts and the advisory abbreviation corresponds to the amount of information contained in an airport and weather advisory. Basically, this variable controls the shortening of the advisory in response to traffic volume on the CTAF.

After the initialization, the foreground routine continuously loops through three general operations: 1) generate a pop-up broadcast if conditions are met; 2) execute appropriate subroutine if a series of clicks are detected; and 3) adjust advisory abbreviation and the pop-up interval in response to the level of activity on CTAF.

A pop-up is a timed or periodic broadcast of information over CTAF initiated by the system. This is opposed to information broadcasted in response to a pilot request by actuating the system. A pop-up broadcast usually includes an identification of the airport along with AWOS-type information or a menu of instructions of how to operate the system and obtain AWOS-type information.

For example, a menu of instructions-type broadcast would include: "Alpha Airport, enter three clicks for advisory, four clicks for radio check." In a pop-up broadcast including the AWOS-type information, the option for an advisory is replaced with relevant weather information.

The pop-up broadcast is usually generated when the time since the last pop-up broadcast exceeds the pop-up interval as determined in step 406. The generation of the pop-up broadcast will be disabled if either a Wait Flag is set to ON as determined in step 408 or a conversation is occurring or has occurred within the last ten seconds, i.e., LASTCONV is less than ten seconds, as determined in step 410.

In the situation in which the frequency is active or recently active as indicated by the fact that LASTCONV is less than ten seconds as determined in step 410 the system delays the pop-up broadcast. This ten second delay enables a broadcaster to finish his/her conversation and allow someone to answer without the pop-up broadcast being injected into an inter-party conversation.

When the Wait Flag is Off and a conversation has not recently occurred, the pop-up broadcast is generated in step 412. Thereafter, in step 414 the pop-up interval is adaptively modified in response to the variable TENTHCONTV. Specifically, the pop-up interval is changed between ten minutes and three minutes in accordance with Table IA.

TABLE IA

| $T_{10}$ (Seconds) | Pop-Up Interval (Minutes) |
|---|---|
| $0 < T_{10} \leq 170$ | 10 |
| $120 < T_{10} \leq 440$ | 5 |
| $600 < T_{10}$ | 3 |

Experience is shown, however, that once the pilots who use an airport become familiar with the operation of the present system, less frequent pop-up intervals are appropriate. Accordingly, intermediate frequency pop-up menus may be desirable as shown in Table IB or when pilots become very familiar with the system, low frequency pop-up intervals are appropriate as shown in Table IC below.

TABLE IB

| $T_{10}$ (Seconds) | Pop-Up Interval (Minutes) |
|---|---|
| $0 < T_{10} \leq 170$ | 30 |
| $120 < T_{10} \leq 440$ | 15 |
| $600 < T_{10}$ | 9 |

TABLE IC

| $T_{10}$ (Seconds) | Pop-Up Interval (Minutes) |
|---|---|
| $0 < T_{10} \leq 170$ | 60 |
| $120 < T_{10} \leq 440$ | 50 |
| $600 < T_{10}$ | 30 |

Then in step 416 the Wait Flag is set ON if the pop-up interval is three minutes. This check is provided so that if the frequency is very inactive such as in the early morning hours, the system will not continuously broadcast the pop-up when there are no listeners. In this case, the system enters a wait mode in which it terminates all broadcasts of the pop-up until a conversation is again detected by setting the Wait Flag to ON in step 418.

After the check for the expiration of the pop-up interval in step 406 and the possible pop-up broadcast, the foreground routine proceeds in step 420 to determine whether an event corresponding to a series of clicks or a conversation has occurred. If CLICKNUM is equal to three, that is if a remote broadcaster has selected the advisory by three clicks of his/her transmit button, then the system transmits an airport and weather advisory in compliance with the advisory abbreviation in step 422.

FIG. 4C shows the broadcast advisory subroutine 422. In steps 502 and 503, the system 100 first checks the status of the carrier detect signal 222. If the frequency is busy, the system will wait for up to one second to continue with the weather advisory subroutine in step 503. If the carrier detect signal, however, is active for longer than one second, then the system's operation returns to FIG. 4A without broadcasting the advisory.

When the frequency is clear or was busy for less than one second, the system reads the sensors and calculates the weather parameters in step 505. In step 510, the system then reviews its records and determines whether an extended weather advisory has been given within the last five seconds. If it has, this system again returns. This filter is directed primarily at the situation in which the system is accidentally or intentionally activated for a third time within a short period. This helps to prevent the abusive intentional jamming of the CTAF frequency.

In step 520, the system reviews the variables indicative of frequency traffic, such as TENTHCONV, FIFTHCONV, and LASTCONV. If the system is very busy, it would be inappropriate to take up precious time on the frequency by broadcasting the weather advisory. In this case, the system broadcasts a short statement such as "Please standby" in step 525, and then sets a delay Advisory Flag in step 530 and returns. The delay Advisory Flag sets a timing loop of, for example, one minute. After the expiration of that timer, the system will again return to step 502 and make another attempt to broadcast the advisory.

If the frequency is not very busy in step 520, this system then determines whether an advisory broadcast has been made within the last five seconds in step 538. If the broadcast is selected twice within five seconds, this is interpreted as a request by the pilot for a weather advisory having all available weather parameters in step 537. This is termed an Extended Advisory. Otherwise, the system determines the relevant weather parameters in step 540. In more detail, the system reviews the weather parameters read from the sensors in step 505. For example, if there is a cross wind problem, the system will broadcast a cross wind caution message. Further, the dew point and temperature will be broadcast only if the parameters are within five degrees of each other, and there is no wind. This indicates the possibility of fog. The temperature will also be given if it is within five degrees of freezing to indicate the possibility of an ice condition. The density altitude will generally not be given unless it is 2,000 feet greater than the airport's elevation.

In step 545, the system reviews the congestion on the frequency and determines which of the weather parameters and related information to broadcast. More specifically, if the advisory abbreviation variable is indicative of no abbreviation, then the broadcasted advisory in step 550 is a complete advisory of all available weather conditions, including barometric pressure, dew point, wind speed, wind direction, density altitude, and any other general notices such as a preferred or suggested runway assignment. Abbreviation levels based on traffic on the frequency define certain conditions in which information is omitted from the broadcast. Any relevant parameters, however, from step 540 will be included regardless of the abbreviation level. A total of five levels of abbreviation are provided as shown in Table II.

TABLE II

| Level | $T_{10} + T_5$ (second) | Audio Advisory |
|---|---|---|
| I | $0 < T_{10} + T_5 \leq 20$ | Wind Data, preferred runway/tail wind caution |
| II | $20 < T_{10} + T_5 \leq 30$ | I + Altimeter |
| III | $30 < T_{10} + T_5 \leq 35$ | II + Temp./Dew/Fog |
| IV | $35 < T_{10} + T_5 \leq 70$ | III + Density Altitude |
| VA | $70 < T_{10} + T_5$ | IV + NOTAMs/Manual Weather |

A preferred runway designation is generated in response to both wind direction and the traffic on the frequency. More specifically, the preferred runway is made on the basis of moving average of the wind direction. The system will be slow to change the suggested runway, however, when traffic is high on the frequency suggesting that a large number of planes are currently in a pattern to land on the current preferred runway. Generally, the system will only change the preferred runway if it would be unsafe to land on the current runway due to tail or cross winds.

Returning to FIG. 4A, if CLICKNUM=4 the radio check subroutine is performed in step 424. The subroutine is completely shown in FIG. 4B. First, the system monitors in step 444 to determine whether or not the frequency is clear, i.e., no one else is currently broadcasting. If no other broadcasts are detected, then the system proceeds. If a broadcast is detected, however, the system will wait for up to one second for the frequency to clear in step 445. If it does not clear in this time period, the system returns. A confirmation of the selection of the radio check feature, for example, "transmit radio check" is performed in step 425 after the frequency is determined to be clear. The system then waits for five seconds for detection of carrier signal in step 426. If a carrier signal is not detected within five seconds as determined in step 427, the process returns to the foreground routine. Once a carrier is detected, the system immediately records any broadcast on the CTAF for up to five seconds in step 428. The recording is then played back in step 430 only after the carrier signal is no longer detected in step 429 so that the broadcaster can confirm that the radio is properly operating by listening to his/her rebroadcasted message.

This method for providing a radio check has certain advantages over traditional methods. When a pilot requests a radio check over the CTAF, he/she rarely knows the position of the person responding to the request. Therefore, although the party performing the radio check may receive a very coherent signal, they do not know across what distance the signal has traveled and thus the strength of the transmission. Secondly, the response of the accepting party is a very subjective determination of the coherence of the broadcast. With the present invention, there is no way of over estimating the quality of the transmission and hence the condition of the pilot's radio. Thirdly, if there is no response, then a radio malfunction may be present. In the present invention, the broadcast the pilot hears is his/her own, allowing the pilot to readily evaluate the signal strength and coherence. Further, since the pilot will know his/her position in relation to the airport, the distance the signal has travelled is also known.

Returning to FIG. 4A, eight clicks, CLICKNUM=8, identifies selection of a proprietary mode subroutine in step 432, which enables an operator to reconfigure the system for special circumstances. To activate, the operator must enter a second number to thereby form a password without any prompting by the system. For example, if the total password for the propriety system is 82, the user must first click the microphone 8 times to select the propriety mode, then pause and click the microphone two more times. These series of clicks with the intervening pause are interpreted as a password, and only upon successful entry will the propriety mode be activated.

In order to select different functions in the propriety mode, the user must click the microphone to select between a number of different options. For example, a first function option would be to add a Notice To AirMen (NOTAM). This is selected by entering the password followed by two clicks. If the function is selected then the system confirms selection and allows the user to record the NOTAM. The next function option, if a NOTAM recording currently exists, is cancellation of the NOTAM announced. This function is selectable by clicking three times after the password and it will erase any current NOTAM's on the system. As another function, the state of the system can be toggled between passive and active modes by four clicks of the microphone to thereby change the system from "sleep" to "awake" or "awake" to "sleep" depending on its current condition. In the sleep mode, the system continues to monitor the CTAF, but broadcasts no pop-up nor reacts to anything but selection of the propriety mode or attempts to access the radio check feature.

Continuing in FIG. 4A, after checking for selection and possible performance of the proprietary mode, the system checks for the simultaneous condition of a conversation and the Wait Flag being set to ON. In this situation, the system has been previously put into a wait state by the inactivity on the frequency. The system is reawakened by the conversation and sets the Wait Flag to OFF in step 470 and also sets the pop-up interval to 10 seconds. Therefore, a pilot entering the airport, who makes a blind transmission to other potential air traffic, will hear a pop-up in ten seconds and be informed of the availability of a weather advisory or radio check.

After the detection of an event in step 420 and any subsequent action, the system modifies the advisory abbreviation variable in response to the TENTHCONV and the FIFTHCONV variables provided by the background routine in step 474. Specifically, in response to the sum of the variables TENTHCONV $T_{10}$ and FIFTHCONV $T_5$, the system enters one of the five levels of abbreviation of the weather advisory as described in Table II above.

The modification of the advisory abbreviation and the time between the pop-up intervals allows the system to adapt to high traffic instances and essentially fall into the background in such situations. Therefore, this system will not take up valuable broadcast time in situations where the channel is required for the more important inter-party communication role.

In the foregoing description, the system allows the pilot to select between the weather advisory 422, radio check 424, and propriety mode 432 on the basis of detected clicks of the pilot's transmit button. Alternatively, this selection could be made with voice recognition software. In more detail, the event could be detected in step 420 in FIG. 4A by applying a voice recognition algorithm to the broadcast on the frequency. If a pilot were to say, for example, "Broadcast advisory", the system would recognize this phrase and activate the broadcast advisory subroutine of FIG. 4C. In a similar vein, the radio check or propriety mode subroutines could be activated by statements such as "radio check" or "propriety", respectively.

Those skilled in the art will know, or be able to ascertain using no more than routine experimentation, many equivalents to the specific embodiments of the invention described herein. These and all other equivalents are intended to be encompassed by the following claims.

What is claimed is:

1. A method for providing weather information to pilots for an airport, comprising:

determining weather conditions for the airport;

monitoring a radio frequency, assigned to voice communications of the airport, for a predetermined protocol indicative of a pilot attempt to access the weather information by classifying broadcasts from other sources based upon a length of a carrier signal;

monitoring the radio frequency for inactivity with no voice transmissions from other sources; and broadcasting an audio weather advisory on the radio frequency in response to detecting the inactivity after detecting the predetermined protocol, the weather advisory being derived from the determined weather conditions.

2. A method as described in claim 1, further comprising stopping the broadcast of the weather advisory after receiving the predetermined protocol in response to detecting transmissions from other sources lasting over a set time period.

3. A method as described in claim 1, further comprising:

determining a level of traffic on the radio frequency; and stopping the broadcast of the weather advisory based on the level of traffic.

4. A method as described in claim 3, further comprising scheduling the broadcast of the weather advisory in the future if the level of traffic was determined to be high.

5. A method as described in claim 1, further comprising:

reviewing the determined weather conditions and determining any relevant weather parameters;

including only relevant weather parameters in the broadcast weather advisory.

6. A method as described in claim 1, wherein the step of monitoring the radio frequency for the predetermined protocol comprises:

applying a voice recognition algorithm to the transmission on the radio frequency; and broadcasting the weather advisory if a selected phrase was detected.

7. A method as described in claim 1, wherein the step of monitoring the radio frequency for the predetermined protocol comprises:

detecting clicks from a transmit button of another transceiver on the radio frequency; and broadcasting the weather advisory if a selected number of clicks was detected.

8. A method as described in claim 1, further comprising the step of:

determining a relative importance of weather conditions and broadcasting a weather advisory including more important weather conditions.

9. A method as described in claim 1, further comprising the step of:

in response to congestion on the radio frequency, reducing a length of the weather advisory by including more important weather parameters.

10. A method as described in claim 1, further comprising the steps of:

categorizing broadcasts from other sources based on a length of a corresponding carrier signal; and adapting a length of the weather advisory based on a level of traffic on the radio frequency.

11. A method as described in claim 1 further comprising the step of:

delaying broadcast of a weather advisory if there is a high level of traffic on the radio frequency.

12. A method for providing weather information to pilots for an airport, comprising:

determining weather conditions for the airport;

monitoring a radio frequency, assigned to voice communications of the airport, for a predetermined protocol indicative of a pilot attempt to access the weather information;

monitoring the radio frequency for inactivity with no voice transmissions from other sources;

broadcasting an audio weather advisory on the radio frequency in response to detecting the inactivity after detecting the predetermined protocol, the weather advisory being derived from the determined weather conditions;

determining if a weather advisory has been recently broadcast; and stopping the broadcast of a new weather advisory if another weather advisory was broadcast.

13. A method for providing weather information to pilots for an airport, comprising:

determining weather conditions for the airport;

monitoring a radio frequency, assigned to voice communications of the airport, for a predetermined protocol indicative of a pilot attempt to access the weather information;

monitoring the radio frequency for inactivity with no voice transmissions from other sources;

broadcasting an audio weather advisory on the radio frequency in response to detecting the inactivity after detecting the predetermined protocol, the weather advisory being derived from the determined weather conditions;

determining a level of traffic on the radio frequency; and adaptively changing a length of the broadcast weather advisory in response to the traffic.

14. A method for providing weather information to pilots for an airport, comprising:

determining weather conditions for the airport;

monitoring a radio frequency, assigned to voice communications of the airport, for a predetermined protocol indicative of a pilot attempt to access the weather information;

monitoring the radio frequency for inactivity with no voice transmissions from other sources;

broadcasting an audio weather advisory on the radio frequency in response to detecting the inactivity after detecting the predetermined protocol, the weather advisory being derived from the determined weather conditions; and automatically broadcasting a message announcing a presence of a system providing the weather information and instructions for its operation.

15. A method for providing weather information to pilots for an airport, comprising:

determining weather conditions for the airport;

monitoring a radio frequency, assigned to voice communications of the airport, for a predetermined protocol indicative of a pilot attempt to access the weather information;

monitoring the radio frequency for inactivity with no voice transmissions from other sources;

broadcasting an audio weather advisory on the radio frequency in response to detecting the inactivity after detecting the predetermined protocol, the weather advisory being derived from the determined weather conditions;

detecting a broadcast on the radio frequency from another source after an extended period of no broadcasts on the radio frequency; and broadcasting the weather advisory.

16. A method for providing weather information to pilots for an airport, comprising:

determining weather conditions for the airport;

monitoring a radio frequency assigned to the airport for a predetermined protocol indicative of a pilot attempt to access the weather information;

monitoring the radio frequency for transmissions from other sources;

determining a level of traffic on the radio frequency;

adaptively changing a length of a weather advisory in response to the traffic; and broadcasting the weather advisory derived from the determined weather conditions on the radio frequency in response to detecting the predetermined protocol.

17. A method as described in claim 12, further comprising automatically broadcasting a message announcing a presence of a system providing the weather information and instructions for its operation.

18. A method as described in claim 16, wherein the step of monitoring the radio frequency for the predetermined protocol comprises:

applying a voice recognition algorithm to the transmission on the radio frequency; and broadcasting the weather advisory if a selected phrase was detected.

19. A method as described in claim 16, wherein the step of monitoring the radio frequency for the predetermined protocol comprises:

detecting clicks from a transmit button of another transceiver on the radio frequency; and broadcasting the weather advisory if a selected number of clicks was detected.

20. A system for broadcasting weather advisories to pilots, comprising:

an automatic weather station which generates weather data indicative of ambient weather conditions;

a transceiver which generates a carrier detect signal in response to transmissions from other sources on a radio frequency, which is assigned for voice communication, and broadcasts weather advisories over the radio frequency; and a central processing unit which monitors the carrier detect signal for inactivity on the radio frequency and generates the voice weather advisories in response to transmission of an activating signal over the radio frequency followed by inactivity on radio frequency determined from the carrier detect signal, the central processing system classifying broadcasts from the other sources in response to lengths of the carrier detect signal.

21. A system as described in claim 20, wherein the central processing unit classifies broadcasts by other sources in response to the lengths of the carrier detect signals, and adaptively changes lengths of the weather advisories in response to the classifications.

22. A system as described in claim 20, wherein the central processing unit stops the broadcast of the weather advisory after receiving the activating signal in response to detecting transmissions from other sources lasting over a set time period.

23. A system as described in claim 20, wherein the central processing unit determines a level of traffic on the radio frequency and stops the broadcast of the weather advisory based on the level of traffic.

24. A system as described in claim 20, wherein the central processing unit reviews the determined weather conditions, identifies any relevant weather parameters, and includes only relevant weather parameters in the broadcast weather advisory.

25. A system as described in claim 20, wherein the central processing unit applies a voice recognition algorithm to detect transmission of the activating signal.

26. A system as described in claim 20, wherein the central processing unit monitors the carrier detect signal to detect transmission of the activating signal.

27. A system for broadcasting weather advisories to pilots, comprising:

an automatic weather station which generates weather data indicative of ambient weather conditions;

a transceiver which generates a carrier detect signal in response to transmissions from other sources on a radio frequency, which is assigned for voice communication, and broadcasts weather advisories over the radio frequency; and a central processing unit which monitors the carrier detect signal for inactivity on the radio frequency and generates the voice weather advisories in response to transmission of an activating signal over the radio frequency followed by inactivity on radio frequency determined from the carrier detect signal, the central processing unit determining if a weather advisory has been broadcast and stops the broadcast of another weather advisory in response to the broadcast weather advisory.

28. A system for broadcasting weather advisories to pilots, comprising:

an automatic weather station which generates weather data indicative of ambient weather conditions;

a transceiver which generates a carrier detect signal in response to transmissions from other sources on a radio frequency, which is assigned for voice communication, and broadcasts weather advisories over the radio frequency; and a central processing unit which monitors the carrier detect signal for inactivity on the radio frequency and generates the voice weather advisories in response to transmission of an activating signal over the radio frequency followed by inactivity on radio frequency determined from the carrier detect signal, the central processing unit determining a level of traffic on the radio frequency and adaptively changing a length of the broadcast weather advisory in response to the traffic.

29. A system for broadcasting weather advisories to pilots, comprising:

an automatic weather station which generates weather data indicative of ambient weather conditions;

a transceiver which generates a carrier detect signal in response to transmissions from other sources on a radio frequency, which is assigned for voice communication, and broadcasts weather advisories over the radio frequency; and a central processing unit which monitors the carrier detect signal for inactivity on the radio frequency and generates the voice weather advisories in response to transmission of an activating signal over the radio frequency followed by inactivity on radio frequency determined from the carrier detect signal, the central processing generating a message announcing a presence of the system and instructions for its operation.

30. A system for broadcasting weather advisories to pilots, comprising:

an automatic weather station which generates weather data indicative of ambient weather conditions;

a transceiver which generates a carrier detect signal in response to transmissions from other sources on a radio frequency, and broadcasts weather advisories over the radio frequency; and a central processing unit which monitors the carrier detect signal for activity on the radio frequency and generates the weather advisories in response to transmission of an activating signal over the radio frequency and changes length of the weather advisories in response to the level of the activity.

31. A method for providing weather information to pilots for an airport, comprising:

determining weather conditions for the airport;

monitoring a radio frequency, assigned to voice communications of the airport, for a predetermined protocol indicative of a pilot attempt to access the weather information;

monitoring the radio frequency for inactivity with no voice transmissions from other sources;

broadcasting an audio weather advisory on the radio frequency in response to detecting the inactivity after detecting the predetermined protocol, the weather advisory being derived from the determined weather conditions;

determining if a weather advisory has been broadcast; and stopping the broadcast of a new weather advisory if another weather advisory was broadcast.

32. A method for providing weather information to pilots for an airport, comprising:

determining weather conditions for the airport;

monitoring a radio frequency, assigned to voice communications of the airport, for a predetermined protocol indicative of a pilot attempt to access the weather information;

monitoring the radio frequency for inactivity with no voice transmissions from other sources;

broadcasting an audio weather advisory on the radio frequency in response to detecting the inactivity after detecting the predetermined protocol, the weather advisory being derived from the determined weather conditions;

determining a level of traffic on the radio frequency; and stopping the broadcast of the weather advisory in response to the level of traffic.

* * * * *

UNITED STATES PATENT AND TRADEMARK OFFICE
CERTIFICATE OF CORRECTION

| | |
|---|---|
| PATENT NO. | : 6,181,260 B1 |
| DATED | : January 30, 2001 |
| INVENTOR(S) | : Gary B. Simon and David Wartofsky |

Page 1 of 1

It is certified that error appears in the above-identified patent and that said Letters Patent is hereby corrected as shown below:

<u>Claim 17,</u>
Line 54, delete -- 12 -- and insert -- 16 --.

Signed and Sealed this

Twenty-third Day of October, 2001

Attest:

NICHOLAS P. GODICI
*Acting Director of the United States Patent and Trademark Office*

*Attesting Officer*